Mar. 3, 1925.
F. SEIBEL
1,528,385
BALL BEARING FOR SPINNING SPINDLES
Original Filed Feb. 3, 1922
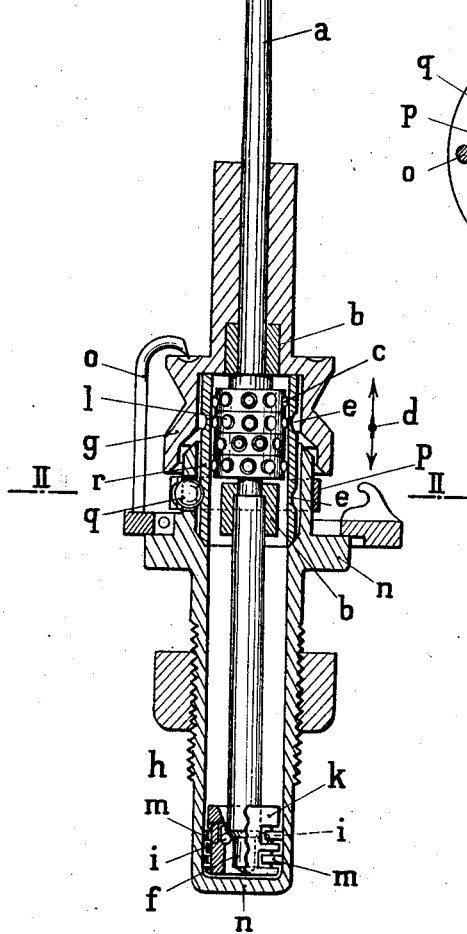
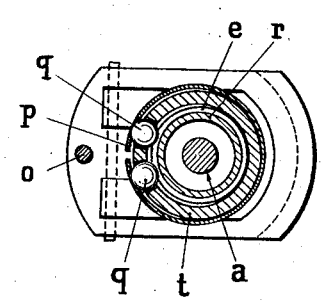
Inventor:
Fritz Seibel
by [signature]
Attorney.

Patented Mar. 3, 1925.

1,528,385

UNITED STATES PATENT OFFICE.

FRITZ SEIBEL, OF BERLIN-CHARLOTTENBURG, GERMANY.

BALL BEARING FOR SPINNING SPINDLES.

Application filed February 3, 1922, Serial No. 533,786. Renewed January 22, 1925.

*To all whom it may concern:*

Be it known that I, FRITZ SEIBEL, a citizen of Germany, residing at 1ᴬ Tauroggenerstrasse, Berlin-Charlottenburg, Germany, have invented certain new and useful Improvements in Ball Bearings for Spinning Spindles, of which the following is a specification.

This invention relates to spindles with ball bearings for spinning machines and jack and twisting frames.

Spindles of this kind are known whose upper neck bearing and lower foot bearing are each arranged to yield independently of one another to the stresses to which they are subjected by the journals of the spindle running in them. The present invention consists in not only arranging the bushings of these upper and lower bearings to be movable in the spindle casing that surrounds them, but in also arranging the balls in the bushings in such a manner that they too will yield and accommodate themselves to deformations of the spindle. Such deformations occur at high speeds and during excentric loads which can never be entirely avoided. In accordance with the invention the upper neck bearing of the spindle is made to adapt itself to these deformations by its row or rows of balls being arranged so that they can move freely along the journal in the direction of its longitudinal axis. The construction of the bearing is preferably such that the individual balls or rows of balls of the neck bearing can travel on the journal independently of each other. This arrangement results in the advantage that it enables each row or ring of balls to shift into whatever oblique plane corresponds to the particular deformation of the spindle. Since, in accordance with the invention, the positions of the balls are adjusted automatically in accordance with the deformations of the spindle and the tracks of the balls on the spindle journal are therefore continually shifted, the balls are prevented from wearing grooves into the journals and the life of the spindles, in comparison with that of spindles the rubbing surface of whose balls is fixed or can only be altered by hand, is considerably increased.

In a specially advantageous and preferred constructional form of the neck bearing of the spindle in accordance with the invention this bearing is provided with a plurality of ball bearings each of which constitutes an element that is easy to manufacture and can be readily replaced. The costs of production and maintenance are thus reduced.

The invention also resides in other novel features of construction of the neck and foot bearings that are based on the principle set forth above.

The invention is illustrated in the drawing by way of example, Fig. 1 being a vertical section, and Fig. 2 a cross-section on the line II—II in Fig. 1.

Referring to the drawings $a$ is the spindle whose bottom end is shaped in the form of a pivot $f$ of reduced diameter so that a circular shoulder is formed that rests upon a ring of balls $i$ which thus carries the thrust or weight of the spindle. The pivot $f$ that extends downwardly beyond the balls or pressure bearing $i$ prevents undue lateral oscillations of the lower end of the spindle when its bottom shoulder is raised from the said balls $i$.

The upper or neck bearing of the spindle comprises a number of individual rings of balls $l$ which are able to shift independently of each other along the journal in the direction of its longitudinal axis. The rings of balls with their cages are placed between two spacing rings or collars $b$ between which the cages and their balls $l$ can move up and down. The outer part of the neck bearing consists of a steel bushing $r$ fitted into the external casing $n$ with a little play. The bushing $r$ is held yieldingly in the spindle casing $n$ by means of a circular spring $p$ that embraces the casing $n$ and a ring of balls $q$ and presses the latter into cavities $e$ in the bushing $r$. The bushing $r$ has a plurality of circular grooves or cavities $e$, one above the other, with balls $q$ arranged in one of the grooves so that the spring pressed balls will still engage with cavities in the bushing if the latter is shifted further up or inserted upside down. Therefore, after the upper half of the bushing $r$ has become worn out through long usage, the bushing may be taken out of the casing $n$ and replaced in the same upside down. The balls $q$ are then pressed by the spring $p$ into a different circular groove or ring of cavities $e$ and the bushing is thus again yieldingly held in position.

The foot bearing consists of a bushing $k$ in which is arranged a ring of balls $i$ on which the shoulder situated at the top end of the pivot $f$ rests. The bushing $k$ has a number of elastic members or spring lugs $m$ formed on its exterior by the material of the bushing being cut away from underneath them and these spring lugs press outwardly against the inner wall of the spindle casing $n$ so that the foot bearing is thus held yieldingly and can accommodate itself to slight changes in the direction of the pressure and other stresses to which it is subjected.

A wharve $g$ is arranged on the spindle $a$ in a known manner, the wharve being held in position by a hinged bow $o$.

I claim:

1. The combination with an upright spindle provided with an upper neck-bearing and a lower foot bearing, of journal bushings for the said upper and lower bearings, and ball bearings in which the journals of the spindle run and which are arranged within the said bushings, the ball bearing for the upper journal consisting of a plurality of rings of balls freely movable in the direction of the length of the spindle.

2. The combination with an upright spindle provided with an upper neck-bearing and a lower foot bearing, of journal bushings for the said upper and lower bearings, and ball bearings in which the journals of the spindle run and which are arranged within the said bushings, the ball bearing for the upper journal consisting of a plurality of rings of balls adapted to move independently of each other in the direction of the axis of the spindle.

3. The combination with an upright spindle provided with an upper neck-bearing and a lower foot bearing, of journal bushings for the said upper and lower bearings, and ball bearings in which the journals of the spindle run and which are arranged within the said bushings, the ball bearing for the upper journal consisting of a plurality of similar ball cages movable independently of each other in the direction of the axis of the spindle, each cage having a ring of ball-retaining recesses.

4. The combination with an upright spindle provided with a casing, an upper neck-bearing, a lower bearing, and journal bushings for the said upper and lower bearings, of spring holding members for holding the journal bushing yieldingly in the said casing, and ball bearings in which the spindle journals run arranged within the said bushings.

5. The combination with an upright spindle provided with an upper neck bearing and a lower foot bearing, of a casing surrounding the spindle and having openings at the height of the said upper bearing, a journal bushing for the upper bearing with recesses in its external surface, a journal bushing for the foot bearing, balls lodged in the openings of the casing and in the recesses in the upper journal bushing, an open elastic ring embracing the said casing and pressing the balls into the said recesses, and a longitudinally movable ball bearing within the said upper journal bushing.

6. The combination with an upright spindle provided with an upper neck bearing and a lower foot bearing, of a casing surrounding the spindle and having openings at the height of the said upper bearing, a movable journal bushing for the upper bearing with recesses at different heights in its external surface, a movable journal bushing for the foot bearing, balls lodged in the openings of the casing and in some of the recesses in the upper journal bushing, an open elastic ring embracing the said casing and pressing the said balls into the said recesses, and a longitudinally movable ball bearing within the said upper journal bushing.

In testimony whereof I have signed this specification in the presence of two witnesses.

FRITZ SEIBEL.

Witnesses:
CHARLES D. TURRELL,
E. HOLTZMANN.